US007478531B2

(12) United States Patent
Ikeda et al.

(10) Patent No.: US 7,478,531 B2
(45) Date of Patent: Jan. 20, 2009

(54) HYDRAULIC CIRCUIT FOR HEAVY CONSTRUCTION EQUIPMENT

(75) Inventors: Toshimichi Ikeda, Changwon (KR); Yang Koo Lee, Changwon (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 476 days.

(21) Appl. No.: 11/408,261

(22) Filed: Apr. 20, 2006

(65) Prior Publication Data

US 2007/0130936 A1 Jun. 14, 2007

(30) Foreign Application Priority Data

Dec. 9, 2005 (KR) ..................... 10-2005-0120538

(51) Int. Cl.
*F16D 31/02* (2006.01)

(52) U.S. Cl. .............................. 60/421; 60/425; 60/429

(58) Field of Classification Search .................. 60/421, 60/425, 428, 429
See application file for complete search history.

(56) References Cited

U.S. PATENT DOCUMENTS 4,449,364 A * 5/1984 Trumper ...................... 60/425

FOREIGN PATENT DOCUMENTS

JP 62055337 A * 3/1987
JP 62284836 A * 12/1987

* cited by examiner

*Primary Examiner*—F. Daniel Lopez
(74) *Attorney, Agent, or Firm*—Ladas and Parry LLP

(57) ABSTRACT

A hydraulic circuit for heavy construction equipment to reduce a speed of a swing apparatus while a working apparatus such as a boom is concurrently operated has a work control valve which controls a working apparatus cylinder; a confluence valve which combines a hydraulic fluid of the second hydraulic pump with the work unit flow path based on a positions switch; a swing control valve which controls the hydraulic swing motor; and a disconnection valve which disconnects the hydraulic fluid supplied to at least one of the swing motors.

5 Claims, 4 Drawing Sheets

HYDRAULIC CIRCUIT FOR HEAVY CONSTRUCTION EQUIPMENT

CROSS-REFERENCE TO RELATED APPLICATION

This application is based on and claims priority from Korean Patent Application No. 10-2005-120538, filed on Dec. 9, 2005, the disclosure of which is incorporated herein in its entirety by reference.

The present application contains subject matter related to Korean patent application No. 2005-120538, filed in the Korean Patent Office On Dec. 9, 2005, the entire contents of which being incorporated herein by reference.

BACKGROUND OF THE INVENTION

Field of the Invention

The present invention relates to a hydraulic circuit for a heavy construction equipment, and in particular to a hydraulic circuit in which a combined operation for a working apparatus can be easily performed so that hydraulic fluid of a confluence valve is supplied to a flow path for a hydraulic cylinder of the working apparatus.

Plural of hydraulic pumps are installed at a conventional hydraulic circuit which has been used at a heavy construction equipment such as an excavator. The hydraulic pumps are used at a hydraulic circuit so as to effectively drive a working apparatus, such as a swing apparatus, a traveling apparatus, etc., by properly distributing a hydraulic energy. Namely, the control valves adapted so as to drive a boom cylinder, an arm cylinder, a bucket cylinder, a hydraulic swing motor for a swing apparatus, a traveling motor for a traveling apparatus, etc. are grouped into at least two control valve groups. Various working apparatuses can be concurrently driven in such a manner that the hydraulic fluid of different hydraulic pump is independently supplied to each control valve group.

However, in the hydraulic circuit which adapts a plurality of hydraulic pumps, the hydraulic circuit adapting a plurality of hydraulic pumps has used a certain technology for combining the hydraulic fluid of the hydraulic pump connected with a certain control valve group. For example, so as to drive a working apparatus which needs a large driving force such as a boom, a control valve for a boom confluence may be adapted, so that the hydraulic fluids of a hydraulic pump of a group of a boom cylinder control valve and a hydraulic pump of the other group are combined for thereby supplying a lot of hydraulic fluid to the boom cylinder.

FIG. 1 is a side view illustrating a conventional excavator.

As shown therein, heavy construction equipment such as an excavator performs various works such as excavation, earth and soil collection, etc at a construction sire. An upper swing structure 7 is installed at a lower traveling structure 5 of the heavy construction equipment with the upper swing structure 7 including an operation room and a working apparatus. The upper swing structure 7 swings about a center axis X with respect to the lower traveling structure 5 based on the swing apparatus 6. When collecting earth and soil, the work apparatuses of a boom 1, an arm 3 and a bucket 4 work together. However, when the collected earth and soil are transferred to a truck, the work apparatuses operate together with the swing apparatus 6.

Generally, since the swing control valve adapted so as to drive the swing apparatus 6 belongs to the group formed of the boom control valve for driving the boom cylinder 2 and the other control valve group, the swing apparatus 6 independently operates without any effects from the operation of the boom cylinder. However, when a control valve for a boom confluence operates while the combined operation of the boom cylinder 2 and the swing apparatus 6 are driven, the operation of the swing apparatus 6 may be largely affected by the load applied to the boom cylinder 2.

In the case that the position of the control valve for a boom confluence is switched so as to operate the boom cylinder 2 by combining the hydraulic fluids of each hydraulic pumps, the control valve group of the swing apparatus 6 is connected with the control valve group of the boom control valve. Namely, since the hydraulic circuits for controlling a swing apparatus 6 and a boom cylinder 2 are connected with each other, the hydraulic pressure applied to the boom cylinder 2 affects the operation of the swing apparatus 6.

FIG. 2 is a schematic view for describing the combined operation of the boom up movement and the swing apparatus. FIG. 3 is a schematic view for describing the problems which occur during the combined operation of the boom up movement and the swing apparatus.

During the work for transferring the collected earth and soil to the truck, the boom up movement and the swing operation are concurrently performed. As shown in FIG. 2, while the position of the bucket 4 is moved from the point A to the point C through the point B, the swing operation and boom up movement are normally performed. At this time, if the movement of the swing apparatus and boom is maintained with a predetermined speed, the collected earth and soil can be safely transferred to a storing region 8 of the truck.

However, in the case that the speed of the swing apparatus sharply increases as the load applied to the boom increases, as shown in FIG. 3, the bucket 4 may collide with the rear end of the truck at the point E which is an intermediate point while the bucket 4 is moved from the point A to the point C. A skilled worker may stop the operation of the swing apparatus or the speed of the same, while visually checking the up position of the boom in the case that the swing speed increases faster than the speed of the boom up movement.

However, a non-skilled worker may cause a certain collision accident as the speed of the swing operation sharply increases by carelessly operating the boom and swing apparatus while the combined operation of concurrently driving the boom and swing apparatus is being driven. In addition, though the skilled worker can avoid any safety accident by giving a careful attention with respect to the operation of the boom and swing apparatus, the workability largely decreases.

SUMMARY OF THE INVENTION

Accordingly, it is an object of the present invention to overcome the problems encountered in the conventional art.

It is another object of the present invention to provide a hydraulic circuit for a heavy construction equipment in which a combined work can be easily performed so that a driving speed of a swing apparatus decreases while a working apparatus such as a boom and a swing apparatus are concurrently operated, and a speed of a working apparatus increases by using a surplus hydraulic oil of the swing operation.

It is further another object of the present invention to provide a hydraulic circuit for a heavy construction equipment in which a hydraulic fluid supplied to part of a hydraulic swing motor, which drives a swing apparatus, is disconnected, and part of the hydraulic fluid is supplied to a working apparatus cylinder by a confluence valve.

To achieve the above objects, there is provided a hydraulic circuit for a heavy construction equipment which comprises a work control valve which controls a working apparatus cylinder by supplying or retrieving a hydraulic fluid of a first hydraulic pump through a work unit flow path; a confluence valve which is installed at a parallel flow path connected with a second hydraulic pump and combines a hydraulic fluid of the second hydraulic pump with the work unit flow path based on a positions switch; a swing control valve which is installed at the parallel flow path and controls the hydraulic swing motor by supplying or retrieving a hydraulic fluid of the second hydraulic pump to a plurality of hydraulic swing motors which drive the swing apparatus; and a disconnection valve which is installed at a swing flow path connecting the swing control valve and the swing motor and is position-switched when the confluence valve is position-switched for thereby disconnecting the hydraulic fluid supplied to at least one of the swing motors and at the same time communicating an inlet and an outlet of the disconnected swing motor.

The confluence valve is position-switched by a pilot signal pressure, and the disconnection valve is position-switched by the pilot signal pressure supplied to the confluence valve.

The confluence valve is position-switched by an electrical signal, and the disconnection valve is position-switched by the electrical signal supplied to the confluence valve.

The disconnection valve is position-switched by a manual operation.

To achieve the above objects, there is provided a hydraulic circuit for a heavy construction equipment which comprises a first valve group which includes a work control valve for driving a working apparatus cylinder; a second valve group which is connected with a plurality of hydraulic swing motors through a swing flow path, with the hydraulic swing motors being adapted so as to drive a swing apparatus, and includes a swing control valve for controlling a hydraulic fluid supplied to the swing motor; a confluence valve which is installed between the second valve group and the first valve group and combines part of the hydraulic fluid of the second valve group with the side of the work apparatus cylinder when the position is switched by a pilot signal; and a disconnection valve which is installed at the swing flow path and disconnects the hydraulic fluid supplied to part of the swing motor as the position is switched by the pilot signal inputted into the confluence valve and connects an inlet and an outlet of the disconnected swing motor.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

Figure 4:
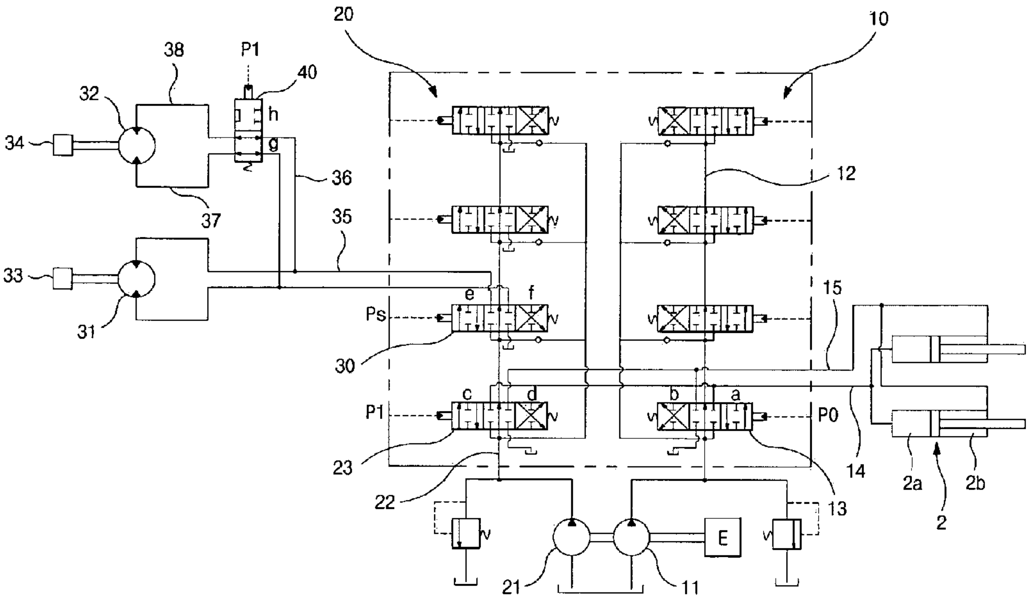
FIG. 4 is a circuit diagram of a hydraulic circuit of a heavy construction equipment according an embodiment of the present invention.
Figure 5:
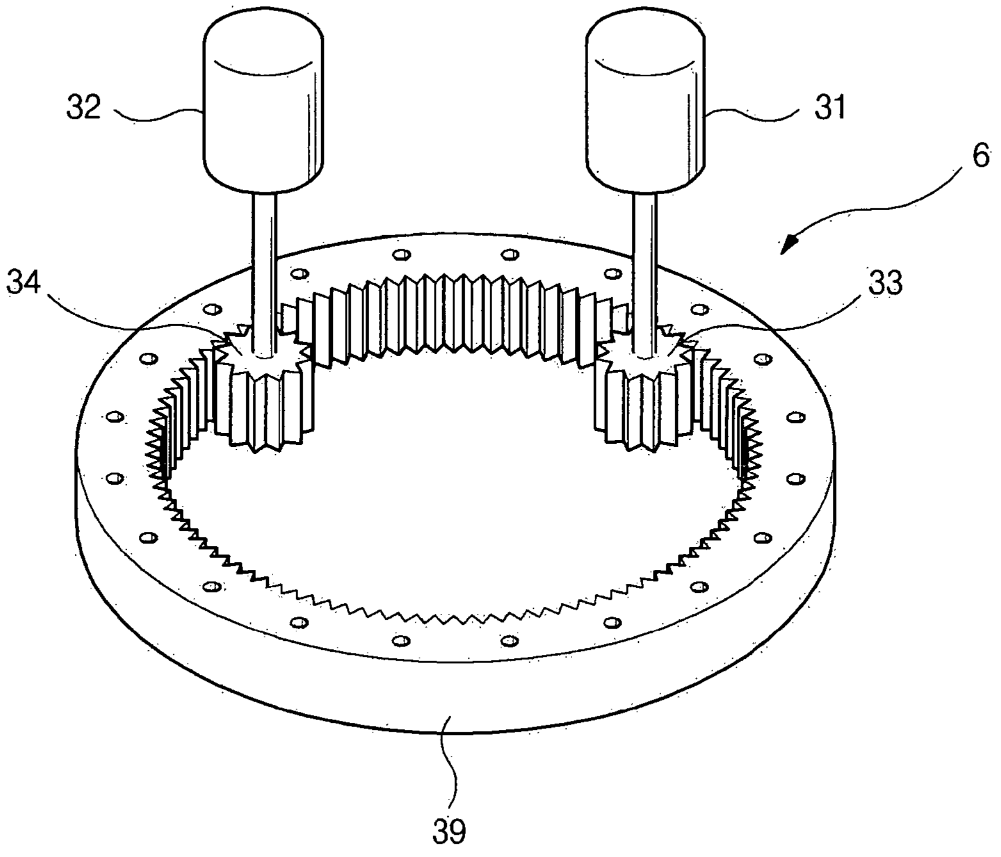
FIG. 5 is a perspective view illustrating a swing apparatus which is driven based on a hydraulic circuit of a heavy construction equipment according to an embodiment of the present invention.

FIG. 4 is a circuit diagram of a hydraulic circuit of a heavy construction equipment according an embodiment of the present invention, and FIG. 5 is a perspective view illustrating a swing apparatus which is driven based on a hydraulic circuit of a heavy construction equipment according to an embodiment of the present invention.

The hydraulic circuit for a heavy construction equipment according to an embodiment of the present invention includes a first valve group 10 and a second valve group 20 which operate by the hydraulic fluid discharged by a first hydraulic pump 11 and a second hydraulic pump 21. Here, the first valve group 10 includes a plurality of control valves disposed at a first parallel flow path 12 connected with the first hydraulic pump 11, and the second valve group 20 includes a plurality of control valves disposed at a second parallel flow path 22 connected with the second hydraulic pump 21.

The hydraulic circuit for a heavy construction equipment according to the present invention comprises a work control valve 13 which drives a working apparatus cylinder 2 by controlling the hydraulic fluid of the first hydraulic pump 11, a confluence valve 23 installed at the second parallel flow path 22, a swing control valve 30 installed at the second parallel flow path 22, and a disconnection valve 40 installed at the swing flow path 36. The work control valve 13 belongs to the first valve group 10, and the swing control valve 30 and the confluence valve 23 belong to the second valve group 20.

Figure 1:
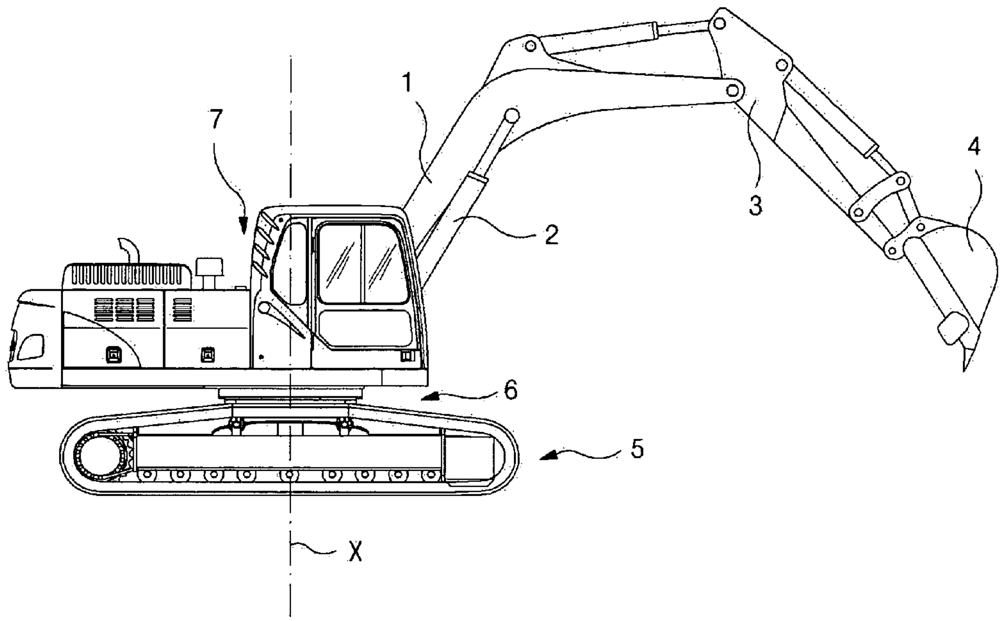
Fig. 1 Prior Art
FIG. 1 is a side view illustrating a construction of a conventional excavator.
Figure 2:
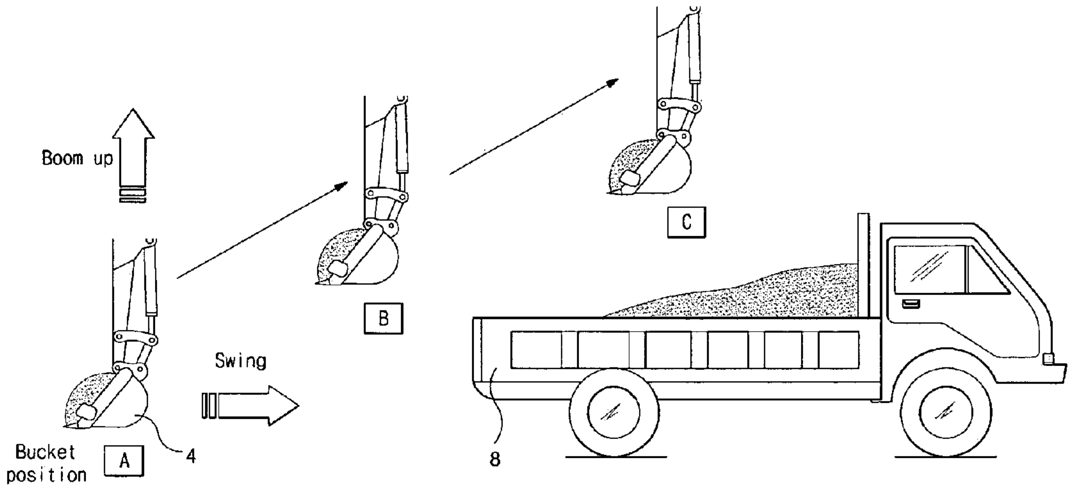
FIG. 2 is a schematic view for describing a combined operation of a boom up movement and a swing apparatus.
Figure 3:
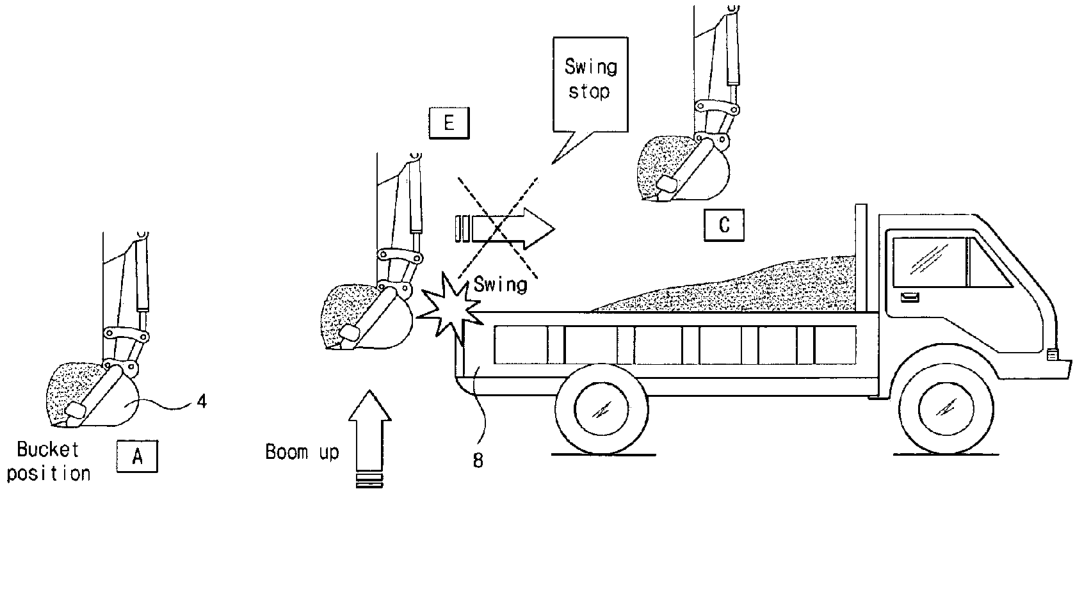
FIG. 3 is a schematic view for describing the problems which occur during a combined operation of a boom up movement and a swing apparatus.

The work control valve 13 is installed at the first parallel flow path 12 and supplies the hydraulic fluid of the first hydraulic pump 11 to the work apparatus cylinder 2 through the work unit flow paths 14 and 15, collects the hydraulic fluid discharged and discharges to the hydraulic tank for thereby driving the work apparatus cylinder 2. Here, the work apparatus cylinder 2 corresponds to the work apparatus cylinder like the boom cylinder 2 of FIG. 1. The position of the work control valve 13 is switched by a pilot signal P0.

The confluence valve 23 is installed at the second parallel flow path 22 and combines the hydraulic fluid of the second hydraulic pump 21 with the work unit flow paths 14 and 15. The position of the confluence valve 23 is switched by a pilot signal P1.

The swing control valve 30 is installed at the second parallel flow path 22 and is connected with a plurality of hydraulic swing motors 31 and 32 through swing flow paths 35 and 36. The swing control valve 30 is designed so that the position of the same is switched by a swing pilot signal Ps. The swing control valve 30 is moved to a switching position e or f by the pilot signal Ps, so that the hydraulic fluid of the second hydraulic pump 21 is supplied to the swing motors 31 and 32, whereby the normal direction or reverse direction operation of the swing motors 31 and 32 are performed.

The disconnection valve 40 is installed at the swing flow path 36 connected with the swing motor 32, with the position of the same being switched by the same pilot signal P1 as the signal inputted into the confluence valve 23. When the pilot signal P1 is inputted into the disconnection valve 40, the disconnection valve moves to the position h, so that the supply of the hydraulic fluid to the swing motor 32 is disconnected, and the inlet 37 and the outlet 38 of the swing motor 32 are connected.

The pilot signals P1, P0 and Ps inputted into the work control valve 13, the confluence valve 23 and the swing control valve 30 may be selected based on the type of the adapted valve. Namely, a pilot signal pressure may be adapted or an electrical signal may be adapted based on the type of the valve.

As shown in FIG. 5, a swing bearing 39 of the swing apparatus 6 is engaged with pinion gears 33 and 34 engaged at the shafts of the swing motors 31 and 32. When the swing motors 31 and 32 rotate, the pinion gears 33 and 34 move along the inner gear of the swing bearing 39 based on the repulsive force of the swing motor, so that the swing apparatus 6 is driven.

The operation of the hydraulic circuit for a heavy construction equipment according to the present invention will be described.

As the pilot signal P0 is inputted into the work control valve 13, and the work control valve 13 is moved to the switching position a or b, the work apparatus cylinder 2 is driven. When the work control valve 13 moves to the switching position a, the hydraulic fluid of the first hydraulic pump 11 is supplied to a large chamber 2*a* of the work apparatus cylinder 2, and the hydraulic fluid of a small chamber 2*b* returns to the hydraulic tank. When the work control valve 13 moves to the switching position b, the hydraulic fluid of the first hydraulic pump 11 is supplied to the small chamber 2*b* of the work apparatus cylinder 2, and the hydraulic fluid of the large chamber 2*a* returns to the hydraulic tank.

The confluence valve 23 installed at the second parallel flow path 22 connected with the second hydraulic pump 21 moves to the switching position c or d based on the pilot signal P1 when a large load is supplied to the work apparatus cylinder 2. When the confluence valve moves to the switching position c or d, the hydraulic fluid of the second hydraulic pump 21 is combined in the direction of the work control valve 13 through the work unit flow paths 14 and 15. With the operation of the confluence valve 23, the amount of the hydraulic fluid supplied to the work apparatus cylinder 2 increases, so that it is possible to perform a certain work which needs a large load.

The swing control valve 30 installed at the second parallel flow path 22 connected with the second hydraulic pump moves to the switching position e or f based on the swing control pilot signal Ps. With the swing control valve 30 being moved to the switching position e or f, the hydraulic fluid of the second hydraulic pump 21 is supplied to the swing motors 31 and 32 through the swing flow paths 35 and 36, and the hydraulic fluid discharged from the swing motors 31 and 32 returned to the hydraulic tank.

While the combined operation is being performed as the work apparatus cylinder 2 and the swing motors 31 and 32 are concurrently driven, and the swing operation and boom up movement are concurrently performed, when the confluence valve 23 operates, the disconnection valve 40 starts operating, so that the hydraulic fluid supplied to the swing motor 32 is disconnected. While the work control valve 13 and the swing control valve 30 concurrently operate for the combined operation, when the combing operation is performed as the pilot signal P1 is inputted into the confluence valve 23, the same pilot signal P1 is inputted into the disconnection valve 40, so that the disconnection valve 40 moves to the switching position h.

The disconnection valve 40, which moved to the switching position h, disconnects the hydraulic fluid of the second hydraulic pump supplied to the swing motor 32 and allows the inlet 37 and the outlet 38 to communicate with each other, so that the swing motor 32 becomes a free rotation state as the pinion gear 34 rotates. Therefore, the swing operation is performed by two swing motors 31 and 32 at usual time, but now the swing operation is performed by only one swing motor 31.

At this time, since only one swing motor 31 operates, the torque decreases in half, and the swing operation is performed with less driving force. When the torque decreases in half, the acceleration also decreases in half, so that the swing speed of the swing apparatus does not increase. Therefore, the amount of oil needed for the swing operation is about ¼.

For the swing operation, the amount of oil needed for the operation of one swing motor is needed based on the operation of the disconnection valve 40. Since the swing speed decreases, the amount of oil needed for the swing operation also decreases, so that the surplus hydraulic fluid is supplied to the direction of the work apparatus cylinder, and the boom up movement speed increases. According to the operation of the hydraulic circuit for the heavy construction equipment according to the present invention, a desired operation balance can be obtained as the boom up movement speed increases, and at the same time the swing speed decreases. With this operation, the present invention can be well adapted to the combined operation when transferring the collected earth and soil into the truck.

The embodiment of the present invention is implemented as the disconnection valve is operated by the pilot signal inputted into the confluence valve. In another embodiment of the present invention, the disconnection valve could operate by the manual operation. Therefore, an operator could manually operate the disconnection valve, while concurrently performing the boom up movement and the swing operation, and disconnects part of the hydraulic fluid supplied to the swing motor. Even when the combining function by the confluence valve operates, it is possible to achieve a desired stable swing operation of the heavy construction equipment.

As described above, according to the hydraulic circuit for a heavy construction equipment according to the present invention, it is possible to increase the speed of the work apparatus by decreasing the swing speed while the work apparatus such as boom and the swing apparatus being concurrently operated, so that the combined operations can be effectively performed.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A hydraulic circuit for a heavy construction equipment, comprising:

a work control valve which controls a working apparatus cylinder by supplying or retrieving a hydraulic fluid of a first hydraulic pump through a work unit flow path;

a confluence valve which is installed at a parallel flow path connected with a second hydraulic pump and combines a hydraulic fluid of the second hydraulic pump with the work unit flow path based on a positions switch;

a swing control valve which is installed at the parallel flow path and controls a swing apparatus by supplying or retrieving a hydraulic fluid of the second hydraulic pump to a plurality of hydraulic swing motors which drive the swing apparatus; and a disconnection valve which is installed at a swing flow path connecting the swing control valve and at least one of the swing motors and is position-switched when the confluence valve is position-switched for thereby disconnecting the hydraulic fluid supplied to at least one of the swing motors and at the same time communicating an inlet and an outlet of the disconnected swing motor.

2. The circuit of claim 1, wherein said confluence valve is position-switched by a pilot signal pressure, and said disconnection valve is position-switched by the pilot signal pressure supplied to the confluence valve.

3. The circuit of claim 1, wherein said confluence valve is position-switched by an electrical signal, and said disconnection valve is position-switched by the electrical signal supplied to the confluence valve.

4. The circuit of claim 1, wherein said disconnection valve is position-switched by a manual operation.

5. A hydraulic circuit for a heavy construction equipment, comprising:

a first valve group which includes a work control valve for driving a working apparatus cylinder;

a second valve group which is connected with a plurality of hydraulic swing motors through a swing flow path, with the hydraulic swing motors being adapted so as to drive a swing apparatus, and includes a swing control valve for controlling a hydraulic fluid supplied to the swing motors;

a confluence valve which is installed between the second valve group and the first valve group and combines part of the hydraulic fluid of the second valve group with the work apparatus cylinder when the position is switched by a pilot signal; and a disconnection valve which is installed at the swing flow path and disconnects the hydraulic fluid supplied to part of the swing motors as the position is switched by the pilot signal inputted into the confluence valve and connects an inlet and an outlet of the disconnected swing motor.

* * * * *